(12) United States Patent
Chen et al.

(10) Patent No.: US 10,777,076 B2
(45) Date of Patent: Sep. 15, 2020

(54) LICENSE PLATE RECOGNITION SYSTEM AND LICENSE PLATE RECOGNITION METHOD

(71) Applicant: National Chung-Shan Institute of Science and Technology, Taoyuan (TW)

(72) Inventors: Shu-Heng Chen, Kaohsiung (TW); Chih-Lun Liao, Taichung (TW); Cheng-Feng Shen, Taipei (TW); Li-Yen Kuo, Tainan (TW); Yu-Shuo Liu, Taoyuan (TW); Shyh-Jian Tang, Taoyuan (TW); Chia-Lung Yeh, Taoyuan (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 90 days.

(21) Appl. No.: 16/219,902

(22) Filed: Dec. 13, 2018

(65) Prior Publication Data

US 2020/0090506 A1    Mar. 19, 2020

(30) Foreign Application Priority Data

Sep. 19, 2018 (TW) .............................. 107133286 A

(51) Int. Cl.
G08G 1/017 (2006.01)
G06K 9/32 (2006.01)
G06K 9/62 (2006.01)

(52) U.S. Cl.
CPC ......... *G08G 1/0175* (2013.01); *G06K 9/3241* (2013.01); *G06K 9/3258* (2013.01);
(Continued)

(58) Field of Classification Search
CPC ........ G08G 1/0175; G08G 1/04; G08G 1/017; G08G 1/052; G08G 1/096791;
(Continued)

(56) References Cited

U.S. PATENT DOCUMENTS 9,760,789 B2 * 9/2017 Burry .................. G06K 9/3258
2002/0080013 A1 * 6/2002 Anderson, III ...... G07C 5/0891
340/425.5

(Continued)

FOREIGN PATENT DOCUMENTS

CN    106778745 A    5/2017
CN    107316016 A    11/2017
(Continued)

OTHER PUBLICATIONS

Duan, Qing-Yuan, Design and Implementation of License Plate Recognition System Based on Vehicle Detection, Mar. 22, 2015, The uploaded file is the abstract of this cited reference, retrieved from http://kns.cnki.net/kcms/detail/detail.aspx?filename=1018707816. nh&dbcode=CMFD&dbname=CMFDTEMP&v=.

*Primary Examiner* — Nimesh Patel
(74) *Attorney, Agent, or Firm* — Winston Hsu

(57) ABSTRACT

A license plate recognition system and a license plate recognition method are provided. The license plate recognition system includes an image capturing module, a determination module and an output module. The image capturing module is utilized for capturing an image of a target object. The determination module is utilized for dividing the image of the target object into a plurality of image blocks. The determination module utilizes the plurality of image blocks to generate feature data and perform a data sorting process on the feature data to generate a first sorting result. The output module outputs the sorting result.

8 Claims, 2 Drawing Sheets

(52) U.S. Cl.
CPC ....... *G06K 9/6226* (2013.01); *G06K 2209/15* (2013.01); *G06K 2209/23* (2013.01)

(58) Field of Classification Search
CPC .......... G08G 1/166; G08G 1/01; G08G 1/162; G08G 1/16; G08G 1/0116; G08G 1/054; G08G 1/164; G08G 1/00; G08G 1/0104; G08G 1/0145; G08G 1/08; G08G 1/22; H04W 12/02; H04W 4/026; H04W 4/027; H04W 4/40; H04W 4/46; H04W 76/14; H04W 4/38; H04W 64/00; G06K 9/3258; G06K 9/6226; G06K 9/3241; G06K 2209/23; G06K 2209/15; G06K 9/325; G06K 9/00; G06K 2009/363; G06K 9/6277; G06K 9/228; G06K 9/22; G06K 9/342; G06K 9/36; G06K 9/4642; G06K 2209/01; G06K 9/00771; G06K 9/00785; G06K 9/00825; G06K 9/00664; G06K 9/2018; G06K 9/4661; G06K 2009/00738; G06K 9/00671; G06K 9/00791; G06K 9/00798; G06K 9/00805; B60R 21/00; B60R 2300/302; G06T 11/60; G06T 3/40; G06T 2207/30252; G06T 3/0093; G06T 5/20; G06T 2207/10004; G06T 2207/20024; G06T 2207/10016; G06T 5/001; G06T 2207/30236; G06T 7/174; G06T 7/75; G06T 13/80; G06T 7/246; G06T 2207/10044; G06T 2207/30241; G06T 7/50; G06T 7/74; G06F 16/5846; G06F 40/171; G06F 40/174; G06F 16/532; G06F 16/50; G06F 16/58; G06F 16/909; G06Q 40/08; G06Q 10/02; G06Q 10/025; G06Q 10/06311; G06Q 10/087; G06Q 10/10; G06Q 10/20; G06Q 30/0601; G06Q 50/265; G07C 5/008; G07C 5/085; G07C 5/0866; G07C 5/0891; G07C 5/12; B60W 2050/0089; B60W 40/10; G01S 13/02; G01S 15/02; G01S 17/02

See application file for complete search history.

(56) References Cited

U.S. PATENT DOCUMENTS

| | | | |
|---|---|---|---|
| 2009/0173552 A1* | 7/2009 | Elder | G06F 40/174 178/18.03 |
| 2012/0062732 A1* | 3/2012 | Marman | G08B 13/19682 348/142 |
| 2012/0106802 A1* | 5/2012 | Hsieh | G06K 9/3258 382/105 |
| 2014/0177925 A1* | 6/2014 | Wu | G06K 9/00 382/105 |
| 2019/0171890 A1* | 6/2019 | Yu | G06K 9/00825 |
| 2019/0260455 A1* | 8/2019 | Ryu | G06T 7/246 |

FOREIGN PATENT DOCUMENTS

| | | |
|---|---|---|
| CN | 107506763 A | 12/2017 |
| CN | 108229474 A | 6/2018 |
| CN | 108388896 A | 8/2018 |

\* cited by examiner

LICENSE PLATE RECOGNITION SYSTEM AND LICENSE PLATE RECOGNITION METHOD

BACKGROUND OF THE INVENTION

1. Field of the Invention

The present invention relates to a recognition system and method, and more specifically to a license plate recognition system and license plate recognition method.

2. Description of the Prior Art

An intersection video surveillance system is commonly used for security monitoring and traffic monitoring. Cameras are usually installed at intersection for recording incidents or accident occurring on the road. An operator or a security person can watch the video monitor of the intersection video surveillance system in order to maintain traffic safety and order. However, under the long hours of monitor watching work, the operator or the security person may be negligent of event occurrence due to fatigue and stress. Thus, most of the role of the intersection video surveillance system is employed for subsequent investigation and obtaining corroborative evidence without for an immediate response to ongoing event or a circumstance. Moreover, when there is a need for tracking the trajectory of vehicle movement. It would require a lot of manpower and time to view the video record of different intersections.

Currently, a license plate recognition technology can be applied to actively monitor the intersection video frame. The meaningless digital signals of the video frame can be converted into meaningful information. However, the main factor that the technology does not become popular is there is a need to add monitors and cameras with high image quality and limit the install angle of cameras for meeting the size of the license plate. For example, the camera needs to be placed just above the intersection. Each camera is merely able to overlook one lane. Thus, it would consume a lot of resources to establish equipment of the video surveillance system at the beginning. Besides, the subsequent maintenance problem also needs to be overcome.

Some factors affect the conventional license plate recognition method, such as image capturing factor and environment factor. For example, regarding the image capturing factor, the conventional license plate recognition method usually acquires the image, segments each character of the plate number in the license plate and recognizes each character of the plate number. The main purpose of the intersection video surveillance system is to monitor the events occurred in or around the lane. For cost consideration, two cameras are installed at the crossroad to cover the entire intersection of the roadways. Under such a condition, since the image capturing angle becomes too large and the resolution is poor, the conventional license plate recognition method cannot perform character segmentation operation of each license plate number character, thus resulting in subsequent recognition errors. Besides, regarding the environment factor, the intersection video surveillance system in outdoors may cause character segment errors due to light and shadow changes, such as glare from the smoke and headlights of oncoming vehicles, shadow under the shade or dark sky. Thus, the conventional license plate recognition method is unable to properly recognize the plate number due to the aforementioned image capturing factor and environment factor.

SUMMARY OF THE INVENTION

Based on the aforementioned disadvantages of the prior art, it is therefore a primary objective of the present invention to provide a license plate recognition system by using machine learning method, rather than the traditional license plate recognition systems using hand-crafted strategies to recognize the license plate.

In order to achieve the aforementioned objective, the present invention provides a license plate recognition system, comprising: an image capturing module for capturing an image of a target object; a determination module for dividing the image of the target object into a plurality of image blocks; and an output module; wherein the determination module utilizes the plurality of image blocks to generate feature data and perform a data sorting process on the feature data to generate a sorting result and the output module outputs the sorting result.

According to one embodiment of the present invention, the determination module comprises a vehicle detection module, a license plate detection module and a license plate recognition module.

According to one embodiment of the present invention, the vehicle detection module is utilized for dividing the image of the target object into the plurality of image blocks, utilizing the plurality of image blocks to generate a plurality of information and obtaining an vehicle image through the plurality of information, the license plate detection module is utilized for performing a feature determination process on the vehicle image to obtain a license plate image, and the license plate recognition is utilized for performing a feature extraction process on the license plate image to obtain a feature vector and performing a classifying process on the feature vector to generate corresponding probabilities and performing the data sorting process on the corresponding probabilities to generate the sorting result.

According to one embodiment of the present invention, the vehicle detection module comprises a grid cell division operation and the network output.

According to one embodiment of the present invention, the license plate recognition module comprises a feature extraction module and a character recognition module.

According to one embodiment of the present invention, the feature determination process comprises a feature extraction, a feature merging and an output layer.

According to one embodiment of the present invention, the present invention further provides a license plate recognition method, comprising: utilizing an image capturing module to capture an image of a target object; utilizing a vehicle detection module to perform a grid cell division operation to obtain a plurality of image blocks and calculating the plurality of image blocks to generate a plurality of information and arranging the plurality of information to obtain a vehicle image; and utilizing a license plate detection module to perform a feature determination process on the vehicle image to obtain a license plate image, and utilizing a license plate recognition to perform a feature extraction process on the license plate image to obtain a feature vector, perform a classifying process on the feature vector to generate a corresponding probability, perform a data sorting process on the corresponding probability to generate a sorting result, and utilizing an output module to output the sorting result.

According to one embodiment of the present invention, the feature determination process comprises a feature extraction, a feature merging and an output layer.

According to one embodiment of the present invention, the present invention further provides a license plate recognition module using the method according to claim 8, the license plate recognition module comprising: a feature extraction module for performing a feature extraction operation on the license plate image to obtain a feature map and reshapes the feature map so as to obtain a feature vector; and a character recognition module for classifying the feature vectors, obtaining corresponding probabilities of the feature vector accordingly and performing a data sorting process on the corresponding probabilities of the feature vectors to generate a sorting result.

According to one embodiment of the present invention, the character recognition module comprises a long short-term memory (LSTM) and a connectionist temporal classification (CTC).

Therefore, through machine learning method, the present invention utilizes the intersection monitor image to obtain the license plate image which is fed to model training. Before the model training, the image processing technique is used to generate the license plate images of different sizes, angles and noise, simulate images of different sizes and resolutions, thus improving the image capturing factor. Compared to conventional license plate recognition systems using hand-crafted strategies, the actual license plate image learned by the machine learning method is more suitable for various environments, thus improving the environment factor. Moreover, in order to apply to various intersection monitors, the trained model can be regarded as the initial model. After obtaining a new intersection monitor image, the recognition result with poor confidence index can be selected through active learning and corrected results can be obtained through manual recognition, such that license plate recognition model can be adjusted accordingly, thus improving the accuracy the recognition rate.

The above summary and the following detailed description and accompanying drawings are all in order to further illustrate the present invention to achieve the intended purpose are taken, means and technical effects. Such other objects and advantages of the invention will be set forth in the subsequent description and the accompanying drawings.

These and other objectives of the present invention will no doubt become obvious to those of ordinary skill in the art after reading the following detailed description of the preferred embodiment that is illustrated in the various figures and drawings.

DETAILED DESCRIPTION

The following illustrates specific embodiments of the present invention, and those skilled in the art can readily understand advantages and effects of the present invention accordingly.

Figure 1:
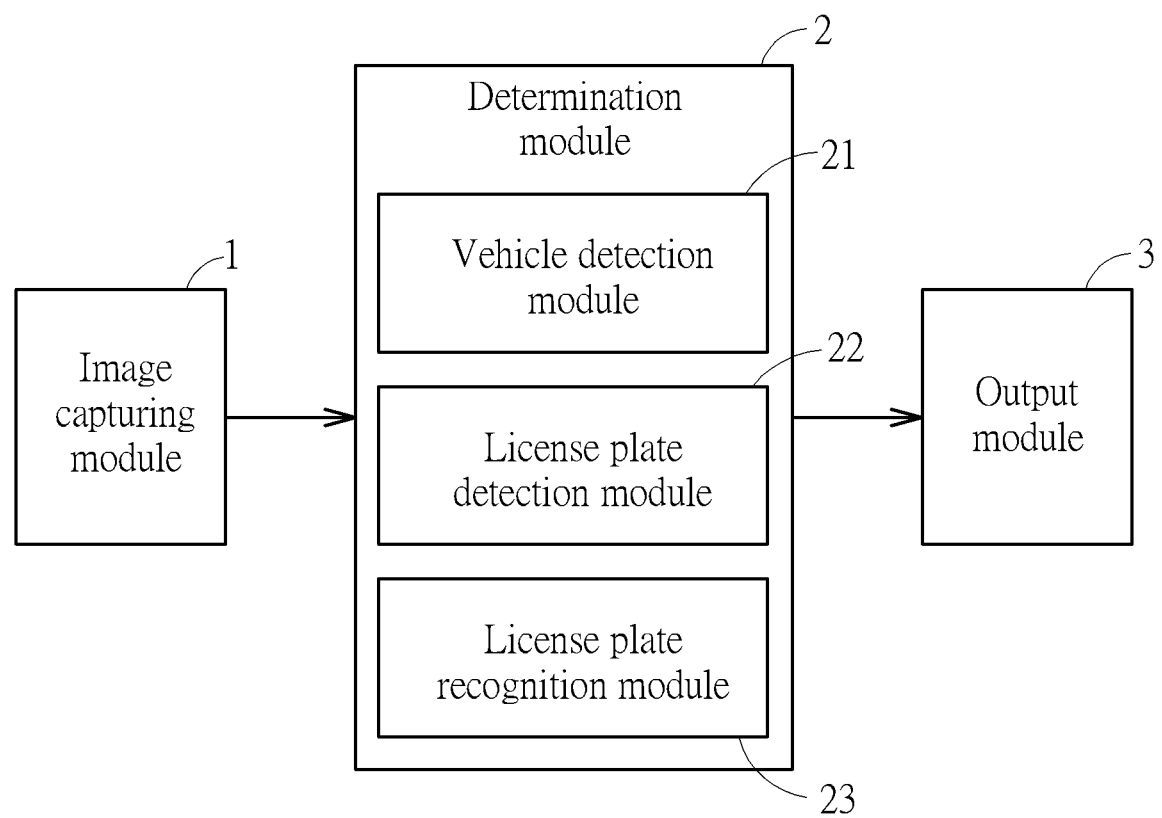
FIG. 1 is a schematic diagram of a license plate recognition system according to an embodiment of the present invention.

Please refer to FIG. 1, which is a schematic diagram of a license plate recognition system according to an embodiment of the present invention. The license plate recognition system includes an image capturing module 1, a determination module 2 and an output module 3. The image capturing module 1 is utilized for capturing an image of a target object. The determination module 2 is utilized for dividing the image of the target object into a plurality of image blocks, utilizing the plurality of image blocks to generate feature data and performing a data sorting process on the feature data to generate a sorting result. After that, the output module 3 outputs the sorting result. The image capturing module 1 includes cameras disposed at the intersection for capturing images of vehicles passing through the intersection and the captured images can be accessed and provided for the following license plate recognition.

In an embodiment, the determination module 2 of the present invention includes a vehicle detection module 21, a license plate detection module 22 and a license plate recognition module 23. The vehicle detection module 21 is utilized for dividing the image of the target object into the plurality of image blocks, utilizing the plurality of image blocks to generating a plurality of information and obtaining a vehicle image through the plurality of information. The license plate detection module 22 is utilized for performing a feature determination process on the vehicle image to obtain a license plate image. The license plate recognition 23 is utilized for performing a feature extraction process on the license plate image to obtain feature vectors, performing a classifying process on the feature vectors to generate corresponding probabilities and performing a data sorting process on the corresponding probabilities to generate a sorting result.

In a preferred embodiment, the image of vehicle captured by the image capturing module 1 at the intersection is inputted to the vehicle detection module 21 of the determination module 2, such that the vehicle detection module 21 determines each frame of the inputted image of the vehicle. The vehicle detection module 21 utilizes a you only look once (YOLO) network structure to obtain the position and range of each vehicle, compares the position of the vehicle of the previous frame and the current frame, tracks each vehicle entering the image frame and numbers each vehicle by using timestamp and universally unique identifier (UUID).

In the YOLO network structure, the target object detection is framed as a regression problem to return the positions of the bounding boxes and associated class probabilities. For the given image of the target object, the YOLO network structure simply uses the neural network once to calculate the position of the bounding box and the probability class. The YOLO network structure includes the grid cell division operation and the network output. The input image is divided into S×S grid cells after performing the grid cell division operation. Each grid cell predicts B bounding boxes and a confidence score for the bounding boxes. The confidence score is the product of the probability of the object of interest, (Pr(Object)), and actual position of the bounding box, $IOU_{pred}^{truth}$. That is, the confidence score may be calculated according to the following equation:

$$\text{confidence}=Pr(\text{Object})\times IOU_{pred}^{truth}$$

For the network output, each bounding box consists of 5 predictions: x, y, w, h and confidence. Where x and y represent the offset of the center of the bounding box relative to the bounds of the grid cell, w and h represent the actual width and height of the bounding box relative to the whole image. Each grid cell also predicts C conditional class probabilities, $Pr(Class_i|Object)$. Each grid cell only produces one set of class probabilities, regardless of the number of bounding boxes B. The conditional class probabilities of each bounding box can be multiplied with the confidence of the each bounding box to obtain a product result. The product result includes probability information of that the predicted class appearing in the bounding box, and reflects how likely the bounding box contains an object and how accurate the coordinate of the bounding box is. The product of the conditional class probabilities of each bounding box and the confidence of the each bounding box can be expressed by the following equations.

$$\text{confidence} \times Pr(\text{Class}_i|\text{Object}) = Pr(\text{Class}_i) \times IOU_{pred}^{truth}$$

The YOLO network structure can represent a plurality of information. The plurality of information may include 19 convolutional layers and 5 max pooling layers. As shown in Table 1, the convolutional layer is used to extract image features. The max pooling layer is used to reduce feature parameters and preserve important features. As shown in Table 1.

TABLE 1

| Type | Filters | Size/Stride | Output |
|---|---|---|---|
| Convolutional | 32 | 3 × 3 | 224 × 224 |
| Max pool | | 2 × 2/2 | 112 × 112 |
| Convolutional | 64 | 3 × 3 | 112 × 112 |
| Max pool | | 2 × 2/2 | 56 × 56 |
| Convolutional | 128 | 3 × 3 | 56 × 56 |
| Convolutional | 64 | 1 × 1 | 56 × 56 |
| Convolutional | 128 | 3 × 3 | 56 × 56 |
| Max pool | | 2 × 2/2 | 28 × 28 |
| Convolutional | 256 | 3 × 3 | 28 × 28 |
| Convolutional | 128 | 1 × 1 | 28 × 28 |
| Convolutional | 256 | 3 × 3 | 28 × 28 |
| Max pool | | 2 × 2/2 | 14 × 14 |
| Convolutional | 512 | 3 × 3 | 14 × 14 |
| Convolutional | 256 | 1 × 1 | 14 × 14 |
| Convolutional | 512 | 3 × 3 | 14 × 14 |
| Convolutional | 256 | 1 × 1 | 14 × 14 |
| Convolutional | 512 | 3 × 3 | 14 × 14 |
| Max pool | | 2 × 2/2 | 7 × 7 |
| Convolutional | 1024 | 3 × 3 | 7 × 7 |
| Convolutional | 512 | 1 × 1 | 7 × 7 |
| Convolutional | 1024 | 3 × 3 | 7 × 7 |
| Convolutional | 512 | 1 × 1 | 7 × 7 |
| Convolutional | 1024 | 3 × 3 | 7 × 7 |
| Convolutional | 1000 | 1 × 1 | 7 × 7 |
| Average pool | | Global | 1000 |
| Softmax | | | |

Where Filters represents the number of convolution kernel, Size/Stride represents the size of the convolution kernel and the number of pixels that the filter shifts, and Output represents output pixels. The plurality of information can be arranged so as to obtain the required vehicle image. In an alternative preferred embodiment, when there are multiple vehicle images shown in the image of the target object. The required vehicle image can be obtained from the image with multiple vehicle images after arranging the plurality of information according to the above-mentioned method of the vehicle detection module 21.

Further, the vehicle image is inputted to the license plate detection module 22 of the determination module 2. The license plate detection module 22 acquires a license plate image (picture) from the vehicle image. For example, the license plate detection module 22 acquires the license plate image in the vehicle image by using an efficient and accurate scene text detector (EAST) deep learning neural network architecture. The license plate detection module 22 can choose a corresponding license plate image of the vehicle which has better position and resolution in the image frame for license plate recognition through the UUID of the vehicle having entered into the image frame. The EAST deep learning neural network architecture is a technique of detecting the position of text in the natural scene image. The EAST deep learning neural network architecture includes two scene text detection methods: rotated box (RBOX) method and quadrangle (QUAD) method. A range of text position can be found through integrating the two scene text detection methods. By using the RBOX method, a length, a width and a rotation angle of the text bounding box of the license plate can be predicted respectively. By using the QUAD method, four points of the text bounding box of the license plate can be predicted. The four points form a quadrilateral (i.e. the text bounding box). The four points are respectively at four corners of the quadrilateral. That is, the position of the quadrilateral is where the text bounding box is.

The EAST deep learning neural network architecture performs a feature determination operation, and the feature determination operation is mainly composed of feature extraction, feature merging and output layer. The feature extraction operation extracts image features of different resolution levels by using four convolution layers. The feature merging operation collects the features of different size. The feature merging operation merges the features. The output layer outputs the detection result. After that, the RBOX method is utilized to obtain the length, width and rotation angle of the text bounding box of the license plate. The QUAD method is utilized to obtain four points of the text bounding box of the license plate, such that the license plate image is obtained accordingly.

Figure 2:
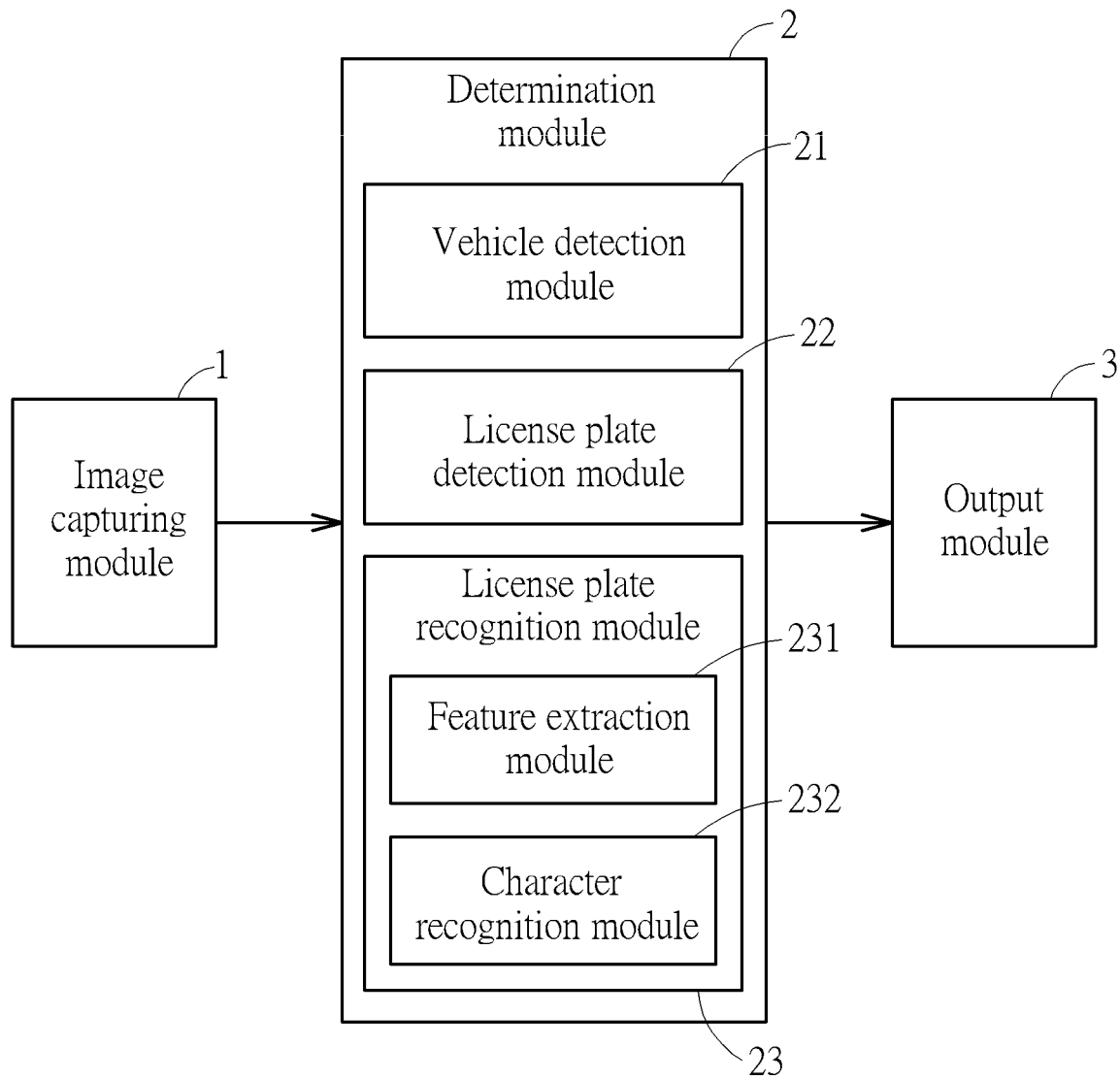
FIG. 2 is a schematic diagram of a license plate recognition module shown in FIG. 1 according to an embodiment of the present invention.

Moreover, please refer to FIG. 2. FIG. 2 is a schematic diagram of the license plate recognition module 23 shown in FIG. 1 according to an embodiment of the present invention. After the license plate image is obtained by the license plate detection module 22, the license plate image is transmitted to the license plate recognition module 23 of the determination module 2 for recognizing text in the license plate image. The license plate recognition module 23 includes a feature extraction module 231 and a character recognition module 232. The feature extraction module 231 performs a feature extraction operation on the license plate image to obtain a feature map and reshapes the feature map so as to obtain feature vectors by using a convolutional neural network (CNN) method. The character recognition module 232 classifies the feature vectors and obtains the corresponding probabilities of the feature vectors by using a long short-term memory (LSTM) method and performing a data sorting operation on the corresponding probabilities of the feature vectors to generate a sorting result by using a connectionist temporal classification (CTC) method.

The license plate image, obtained by the license plate detection module 22 using the EAST deep learning neural network architecture, is utilized as an input of the feature extraction module 231 of the license plate recognition module 23. After the license plate image is transmitted to the license plate recognition module 23, the feature extraction module 231 performs image translation and mapping operations on the license plate image to extract txt features from the license plate image and accordingly generate the feature map by using the CNN method. Moreover, for meeting the input requirements of the character recognition module 232 of the license plate recognition module 23, the feature map can be reshaped to a set of feature vectors through mathematic translation. The feature vectors can be utilized as the input of the character recognition module 232.

The character recognition module 232 of the license plate recognition module 23 receives the feature vectors corresponding to the license plate image from the feature extraction module 231. The feature vectors are inputted to an LSTM network of the character recognition module 232. The LSTM network classifies the feature vector of each column (or each row) to predict the probability of the possible text for the feature vector of each column (or each row). The CTC method calculates a maximum probability of a sequence prediction result according to the corresponding probability of each feature vector and text. For example, the prediction result is "ssttttt---eeeee-a----kk". Further, the CTC method can remove separatrix symbols and punctuation symbols, and merge duplicated words, such that the final prediction result is "steak".

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A license plate recognition system, comprising:
   an image capturing module for capturing an image of a target object;
   a determination module, comprising:
      a vehicle detection module, for dividing the image of the target object into a plurality of image blocks, utilizing the plurality of image blocks to generate a plurality of information and obtaining an vehicle image through the plurality of information;
      a license plate detection module, for performing a feature determination process on the vehicle image to obtain a license plate image; and
      a license plate recognition module, for performing a feature extraction process on the license plate image to obtain a feature vector and performing a classifying process on the feature vector to generate corresponding probabilities and performing a data sorting process on the corresponding probabilities to generate a sorting result; and
   an output module, for outputting the sorting result.

2. The license plate recognition system of claim 1, wherein the vehicle detection module comprises a grid cell division operation and the network output.

3. The license plate recognition system of claim 1, wherein the license plate recognition module comprises a feature extraction module and a character recognition module.

4. The license plate recognition system of claim 1, wherein
   the feature determination process comprises a feature extraction, a feature merging and an output layer.

5. A license plate recognition method, comprising:
   utilizing an image capturing module to capture an image of a target object;
   utilizing a vehicle detection module to perform a grid cell division operation to obtain a plurality of image blocks and calculating the plurality of image blocks to generate a plurality of information and arranging the plurality of information to obtain a vehicle image; and
   utilizing a license plate detection module to perform a feature determination process on the vehicle image to obtain a license plate image, and utilizing a license plate recognition module to perform a feature extraction process on the license plate image to obtain a feature map, reshape the feature map to obtain a feature vector, perform a classifying process on the feature vector to generate a corresponding probability, perform a data sorting process on the corresponding probability to generate a sorting result, and utilizing an output module to output the sorting result.

6. The license plate recognition method of claim 5, wherein the feature determination process comprises a feature extraction, a feature merging and an output layer.

7. A license plate recognition module using the method according to claim 6, comprising:
   a feature extraction module for performing a feature extraction operation on the license plate image to obtain a feature map and reshapes the feature map so as to obtain a feature vector; and
   a character recognition module for classifying the feature vectors, obtaining corresponding probabilities of the feature vector accordingly and performing a data sort process on the corresponding probabilities of the feature vectors to generate a sorting result.

8. The license plate recognition module of claim 7, wherein the character recognition module comprises a long short-term memory (LSTM) and a connectionist temporal classification (CTC).

* * * * *